United States Patent [19]

Harrigan

[11] Patent Number: 4,758,072
[45] Date of Patent: Jul. 19, 1988

[54] GAS ZOOM LENS ASSEMBLY
[75] Inventor: Michael E. Harrigan, Webster, N.Y.
[73] Assignee: Xerox Corporation, Stamford, Conn.
[21] Appl. No.: 932,965
[22] Filed: Nov. 20, 1986
[51] Int. Cl.$^4$ ............................ G02B 1/06; G02B 3/12
[52] U.S. Cl. ...................................... 350/419; 350/255
[58] Field of Search ................................ 350/419, 418
[56] References Cited

U.S. PATENT DOCUMENTS

| 3,630,519 | 12/1971 | Spear, Jr. | 271/53 |
| 3,640,605 | 2/1972 | Sissel | 350/184 |
| 4,331,388 | 5/1982 | McCrobie et al. | 350/419 |

OTHER PUBLICATIONS

Rees, "Technique for Varying Focal Length of a Lens", Xerox Disclosure Journal, vol. 1, No. 11/12, Nov./Dec. 1976, pp. 61–62.
Zambelli, S.N. 902,736; filed 9/02/86.

Primary Examiner—John K. Corbin
Assistant Examiner—Rebecca D. Gass

[57] ABSTRACT

A gas zoom lens of the double Gauss type is disclosed. The lens, at a unity magnification setting, has cavities between the outer lens elements filled with a gas under a first pressure and a central cavity filled with the same gas at a second lower pressure. When the lens is moved to alternate magnification positions, its focal length is adjusted by changing the relative pressure, and hence the refractive index of the gas within the cavities, thereby adjusting the focal length of the lens for the particular magnification.

3 Claims, 2 Drawing Sheets

GAS ZOOM LENS ASSEMBLY

This invention relates to a multi-element zoom lens whose focal length is varied in response to a desired magnification change by varying the pressure of a gas enclosed between at least two of the lens elements and, more particularly, to a gas zoom lens of the double Gauss form.

As is known in the art, multi-element zoom lenses typically achieve a variation in focal length by mechanically varying the spacing between elements or groups of elements. U.S. Pat. Nos. 3,630,599 and 3,640,605 are representative of such lenses. These lenses require very precise movement of lens elements or lens groupings typically involving use of cams and related linkages. These demands result in relatively high cost.

A technique for varying focal length in a compound lens by varying gas pressure at the interlens media has been described by James D. Rees in an abstract entitled "Technique for Varying Focal Length Of A Lens" published in Xerox Disclosure Journal, Vol. 1, No. 11/12, Nov./Dec. 1976, pp. 61-62. U.S. Pat. No. 4,331,388 discloses a preferred gas zoom lens construction using a preferred group of gases in an enclosed cavity between lens elements. Copending U.S. application Ser. No. 902,736, assigned to the same assignee as the present invention, discloses a gas zoom lens assembly with an improved mechanism for varying the gas pressure in a single chamber in response to magnification changes.

In the Rees '388 patent, a focal length change of about 4.5% was possible using the embodiments and gases disclosed therein. The magnification range was limited to between 0.64 and 1.46. It is desirable to provide a gas zoom lens with a greater effective focal length change and with an extended magnification range. The present invention is therefore directed to an improved gas zoom lens system with a greater effective focal length change and with an extended magnification range the lens system comprising, in combination: a plurality of lens elements symmetrically arranged along an axis, the lens having a plurality of enclosed cavities, and means to symmetrically vary the relative pressure in said cavities so as to change the refractive index of said cavities, thereby causing a corresponding variation in the focal length of the lens;

at least two of the cavities filled with a gas maintained at specified pressures relative to each other; and means to symmetrically vary the relative pressure in said cavities so as to change the refractive index of said cavity, thereby causing a corresponding variation in the focal length of the lens.

DESCRIPTION

Although the present invention has utility in a wide variety of applications, the following description is directed towards its use as the imaging lens in a variable magnification copier.

In a copying environment when variable magnification is desired, a magnification range of $1.0 \pm 0.6$ is generally sufficient for most copying purposes. This relatively small magnification range necessitates a correspondingly limited range of lens focal length change.

Focal length and magnification in an optical system are related by the following equation.

$$TC = (F + F/m) + (F + Fm) \text{ (thin lens approximation)} \quad (1)$$

wherein:
TC = total conjugate
F = lens focal length
m = magnification
(F + F/m) = object conjugate
(F + Fm) = image conjugate The focal length of a compound lens is a function of several parameters, including the refractive index of the interlens media. The lens focal length can be changed by varying the refractive index of the medium between the lenses, (which is temperature and pressure dependent) in accordance with the following relationship:

$$n_{tp} - 1 = (n_o - 1)/(1 + at) + P/760 \text{ (ideal gas approximation)} \quad (2)$$

wherein:
$n_{tp}$ = index of refraction of gas at given temperature and pressure
$n_o$ = index of refraction of gas at 0° C. and 760 mm Hg
t = temperature in °C.
a = coefficient of thermal expansion of gas
p = pressure of gas in mm Hg
P/760 = number of atmospheres pressure As is known in the art, changes in the index of refraction of an element or air space ($\Delta n$) can be correlated to a specific change in lens focal length ($\Delta f$). U.S. Pat. No. 4,331,388, whose contents are hereby incorporated by reference, disclosed preferred groups of heavy, high index gases at various pressures for specific lens design. The magnification range which can be covered relates to the fractional focal length change $\Delta f/f$ and is expressed as $$m = \frac{1 - \frac{\Delta f}{f} \pm 2\sqrt{\frac{-\Delta f}{f}}}{1 + \frac{\Delta f}{f}} \quad (3)$$

Figure 1:
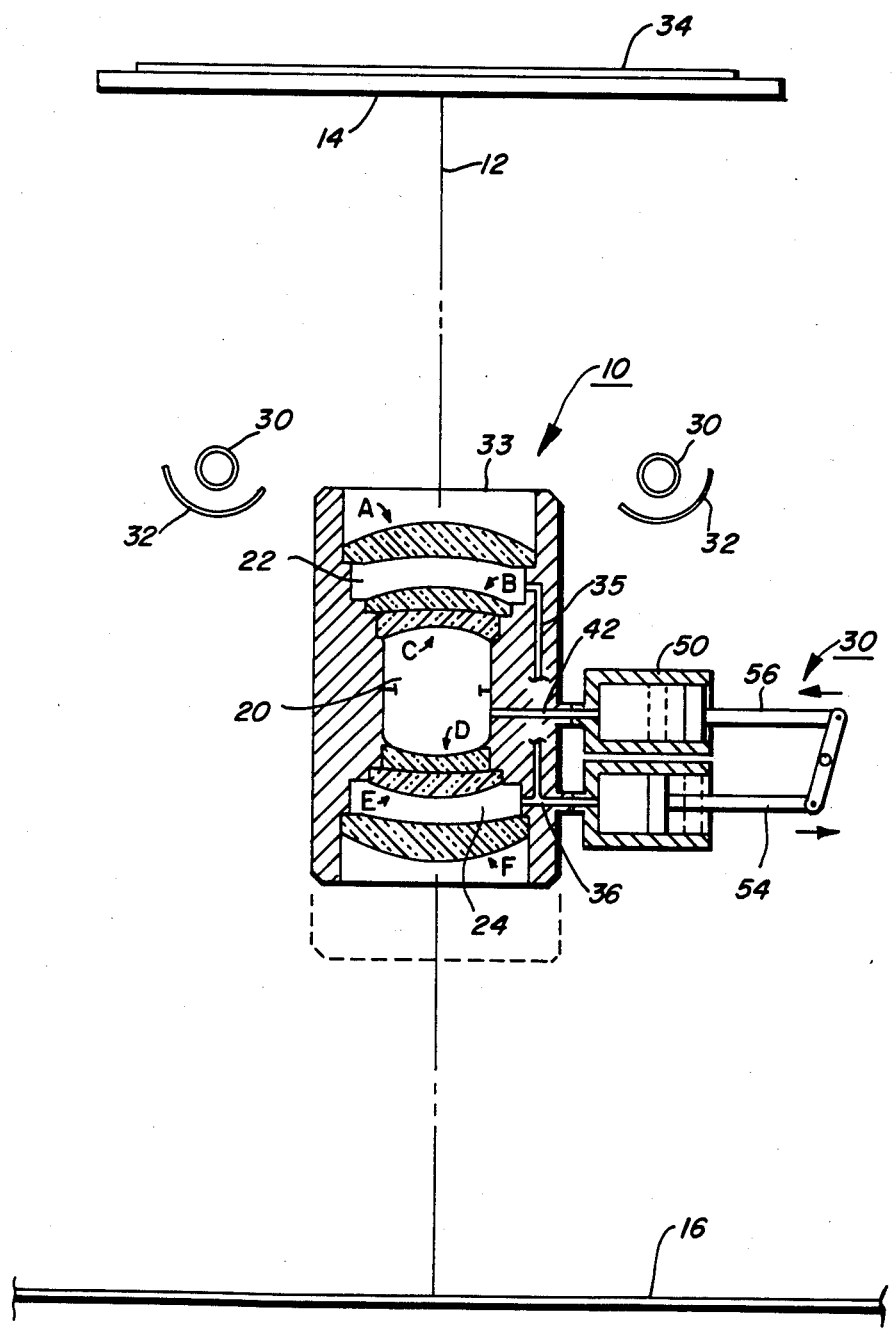
FIG. 1 is a side schematic view of the gas zoom lens assembly of the present invention in a multimagnification, full-frame photocopier.

It has been found that the focal length change, and the magnification range, can be extended by using a lens having multiple enclosed chambers filled with the same gas. The relative pressure between the chambers can then be adjusted coincident with a change in magnification. FIG. 1 is a schematic representation of an improved gas zoom lens 10 according to the invention, used in a full frame, variable magnification copier environment.

Referring now to FIG. 1, gas zoom lens 10 is disposed along an optical axis 12 intermediate an object plane 14 and a photosensitive image plane 16.

Flash lamps 30 and reflectors 32 illuminate the underside of platen 14 upon which a document 34, to be reproduced is placed. Lens 10, at the solid line position, is at unity magnification position and projects an image of document 34 onto a photosensitive image plane 16, which may be, for example, a belt-type photoreceptor.

Figure 2:
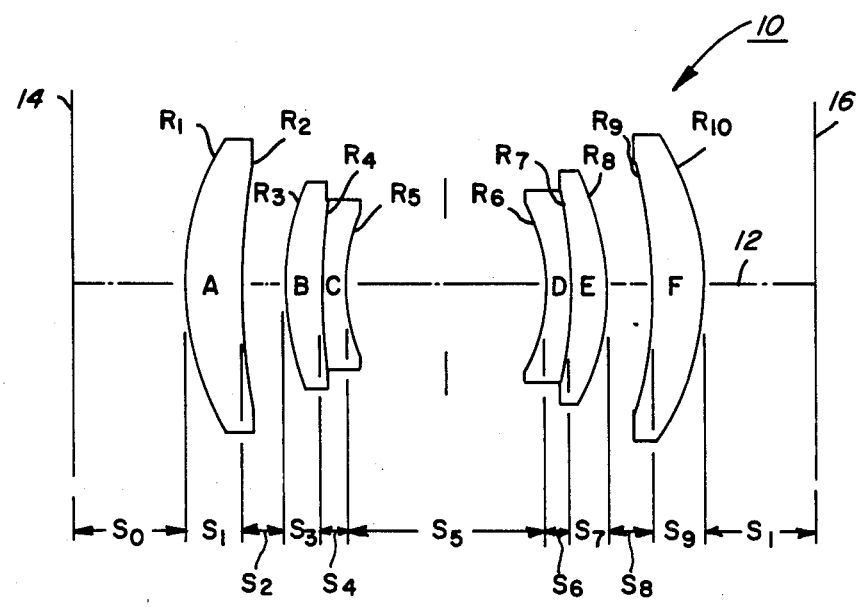
FIG. 2 is a side view of the gas zoom lens of FIG. 1.

Lens 10, shown in a side view in FIG. 2, is a double Gauss type symmetrical lens comprising a first outer lens element A, a first and second lens group comprising doublets BC and DE and a second outer lens element F. The lens elements are symmetrically arranged about a central chamber 20 which separates doublets BC and DE. A second and third chamber 22, 24 separates outer element A and double BC and outer element F and doublet DE. Lens data for a preferred embodiment is presented in the following Table. Chambers 20, 22, 24 are pneumatically coupled with a variable gas pressure mechanism 30, which, in a preferred embodiment, is a piston/cylinder dual drive device.

achieved. Using this value in Equation (3) provides a magnification range of 0.599 to 1.665.

While the invention has been described with reference to the structure disclosed, it is not confined to the details set forth, but is intended to cover such modifications or changes as may come within the scope of the following claims.

TABLE

| LENS | RADIUS | SPACING | REFRACTIVE INDEX | V-NUMBER | |
|---|---|---|---|---|---|
| $AR_1$ | 52.326 | 10.763-$S_1$ | 1.62041 | 60.3 | |
| $R_2$ | 110.730 | 08.370-$S_2$ | 1.0075 to | 1.000 | (High pressure gas @ 1x low in R/E) |
| $BR_3$ | 49.551 | 7.271-$S_3$ | 1.62041 | 60.3 | |
| $R_4$ | 108.785 | 4.385-$S_4$ | 1.59551 | 39.2 | |
| $CR_5$ | 33.266 | 19.338-$S_5$ | 1.000 to | 1.0075 | (Low pressure @ 1x. High in R/E) |
| STOP | | 19.338 | 1.000 to | 1.0075 | (Low pressure @ 1x. High in R/E) |
| $DR_7$ | −108.785 | 4.385-$S_6$ | 1.59551 | 39.2 | |
| $ER_8$ | −49.551 | 7.271-$S_7$ | 1.62041 | 60.3 | |
| $FR_9$ | −110.730 | 8.370-$S_8$ | 1.0075 to | 1.000 | (High pressure gas @ 1x low in R/E) |
| $R_{10}$ | −52.326 | 10.763-$S_9$ | 1.62041 | 60.3 | |

At the 1X position shown in FIG. 1, chamber 20 is filled with a gas at a pressure resulting in chamber 20 having a refractive index of 1.000. Chambers 22, 24 are filled with the same gas at a second pressure which results in these chambers having a higher refractive index (e. g. 1.0075). Chambers 22, 24 are connected by conduits 35, 36 to a first piston/cylinder arrangement 40. Chamber 20 is connected by a conduit 42 to a piston/cylinder arrangement 50. The pistons 54, 56 are shown at a position within the cylinder which provides the required pressures to each chamber at the 1X magnification position.

It is assumed that the object to lens distance $S_0$, (FIG. 2) for this embodiment is 305.483 mm. Since the system is at 1X magnification, the lens to image plane distance $S_1$ is also 305.483 mm. Assuming further that a change in the magnification value to 0.633X has been selected, lens 10 must be moved to the dotted line position shown in FIG. 1. For this magnification value, $S_0$ =389.544 and $S_1$ =221.422. The refractive index of the chambers 22, 24 must change (decrease) from 1.0075 to 1.000 and chamber 20 index must change (increase) from 1.000 to 1.0075. This is accomplished by simultaneously moving pistons 54, 56 to the new dotted line positions. The movement is controlled by a cam/link mechanism as is known in the art or as disclosed in previously referenced U.S. application Ser. No. 902,736, whose contents are hereby incorporated by reference. Thus, piston 54, which controls the pressure in chambers 22, 24 is moved to the dotted line position to decrease the pressure to these chambers. Piston 56 is moved to the dotted line position to increase the pressure in chamber 20. The effective lens formed by chamber 20 becomes more positive; the effective lenses formed by chambers 26, 24 become less positive and the focal length of the entire lens changes in accordance with Equation (2). It has been found that for the preferred embodiment, an effective focal length change ($\Delta f/f$) of up to ±6.2% is

What is claimed is:

1. A gas zoom lens system comprising, in combination, a plurality of lens elements arranged along an axis, the lens having
    an enclosed central chamber formed between two sets of lens elements, said central chamber filled with a gas at a first pressure and further having a plurality of outer chambers, formed between additional lens elements, said outer chambers filled with a gas at a second pressure and
    means to symmetrically vary the relative pressure in said central and outer chambers so as to change the refractive index of said chambers, thereby causing a corresponding variation in the focal length of the lens.

2. The gas zoom lens of claim 1 wherein the central and outer chambers are filled with the same gas and wherein the pressure in the central chamber is increased relative to the outer chambers to cause a decrease in lens focal length.

3. A gas zoom lens system consisting of a first and second outer lens element group and a first and second inner lens element group, the first and second outer lens element group comprising a positive meniscus element convex to the front and a negative meniscus element convex to the front, respectively, the first and second inner lens element group consisting of a pair of meniscus element doublets, the lens groups being arranged along an optical axis to form a central chamber between said pair of doublets and to form outer chambers between said doublets of the inner group and said outer lens elements, said cavities filled with a gas under a pressure to provide a characteristic refractive index for the lens system, said lens system further including means to vary the pressure of the gas in all three chambers thereby causing a corresponding variation in the focal length of the lens.

* * * * *